(12) United States Patent
Johnston et al.

(10) Patent No.: US 10,331,288 B2
(45) Date of Patent: Jun. 25, 2019

(54) METHOD AND SYSTEM FOR GENERATING OILFIELD OBJECTS

(71) Applicant: Schlumberger Technology Corporation, Sugar land, TX (US)

(72) Inventors: Lucian Johnston, Sugar Land, TX (US); Mark S. Passolt, Hansville, WA (US)

(73) Assignee: Schlumberger Technology Corporation, Houston, TX (US)

( * ) Notice: Subject to any disclaimer, the term of this patent is extended or adjusted under 35 U.S.C. 154(b) by 638 days.

(21) Appl. No.: 14/872,608

(22) Filed: Oct. 1, 2015

(65) Prior Publication Data

US 2016/0098155 A1    Apr. 7, 2016

Related U.S. Application Data

(60) Provisional application No. 62/058,878, filed on Oct. 2, 2014.

(51) Int. Cl.

| | |
|---|---|
| G06F 3/048 | (2013.01) |
| G06F 3/0481 | (2013.01) |
| G06F 3/0484 | (2013.01) |
| G06T 19/20 | (2011.01) |
| E21B 41/00 | (2006.01) |
| G01V 99/00 | (2009.01) |

(52) U.S. Cl.
CPC ............ *G06F 3/0481* (2013.01); *E21B 41/00* (2013.01); *G06F 3/04842* (2013.01); *G06T 19/20* (2013.01); *G01V 99/005* (2013.01)

(58) Field of Classification Search
None
See application file for complete search history.

(56) References Cited

U.S. PATENT DOCUMENTS

| | | | |
|---|---|---|---|
| 8,745,581 B2 * | 6/2014 | Esbensen | G06F 17/24 |
| | | | 717/110 |
| 2007/0199721 A1 * | 8/2007 | Givens | G06Q 10/06 |
| | | | 166/382 |

(Continued)

OTHER PUBLICATIONS

"Addselected", https://knowledge.autodesk.com/support/autocad/learn-explore/caas/CloudHelp/cloudhelp/2015/ENU/AutoCAD-Core/files/GUID-771C0F16-5866-4752-A05D-792FE5D76050-htm.html, Jul. 8, 2014, 4 pages. (Year: 2014).*

(Continued)

*Primary Examiner* — Andrey Belousov
*Assistant Examiner* — Haimei Jiang
(74) *Attorney, Agent, or Firm* — Alec J. McGinn

(57) ABSTRACT

A method. The method may include obtaining, from a graphical user interface (GUI), a selection of a first oilfield object. The first oilfield object may define a portion of a first wellbore design. The method may further include determining a target context of a second wellbore design. The method may further include obtaining, from the first oilfield object, source oilfield data describing the portion of the first wellbore design. The method may further include adjusting the source oilfield data, according to the target context of the second wellbore design, to obtain target oilfield data for the second wellbore design. The method may further include generating, using the target oilfield data, a second oilfield object within the target context. The method may further include presenting, within the GUI, the second oilfield object.

18 Claims, 9 Drawing Sheets

(56) References Cited

U.S. PATENT DOCUMENTS

| | | | | |
|---|---|---|---|---|
| 2008/0179094 A1* | 7/2008 | Repin | ............... | E21B 44/00 |
| | | | | 175/50 |
| 2008/0288226 A1* | 11/2008 | Gurpinar | ............ | E21B 43/00 |
| | | | | 703/10 |
| 2008/0289877 A1* | 11/2008 | Nikolakis-Mouchas | ............... | |
| | | | | E21B 7/04 |
| | | | | 175/57 |
| 2009/0144148 A1* | 6/2009 | Jung | ............ | G06Q 30/0222 |
| | | | | 705/14.23 |
| 2009/0229819 A1* | 9/2009 | Repin | ............... | E21B 47/00 |
| | | | | 166/250.01 |
| 2011/0264429 A1* | 10/2011 | Lee | .............. | E21B 47/022 |
| | | | | 703/10 |
| 2012/0096070 A1* | 4/2012 | Bryzak | ............ | H04L 67/02 |
| | | | | 709/203 |
| 2013/0191081 A1* | 7/2013 | Jain | .................. | G06F 17/50 |
| | | | | 703/1 |
| 2014/0006992 A1* | 1/2014 | Broussard, III | ..... | G06F 3/04847 |
| | | | | 715/771 |
| 2014/0088932 A1* | 3/2014 | Pietzsch | ......... | G05B 19/0428 |
| | | | | 703/1 |
| 2015/0019991 A1* | 1/2015 | Kristj Nsson | ....... | H04L 41/22 |
| | | | | 715/747 |

OTHER PUBLICATIONS

International Search Report and Written Opinion issued in Internaitonal Application No. PCT/US2015/053628 dated Jan. 12, 2016. 10 pages.

International Preliminary Report on Patentability issued in Internaitonal Application No. PCT/US2015/053626 dated Apr. 13, 2017, 6 pages.

* cited by examiner

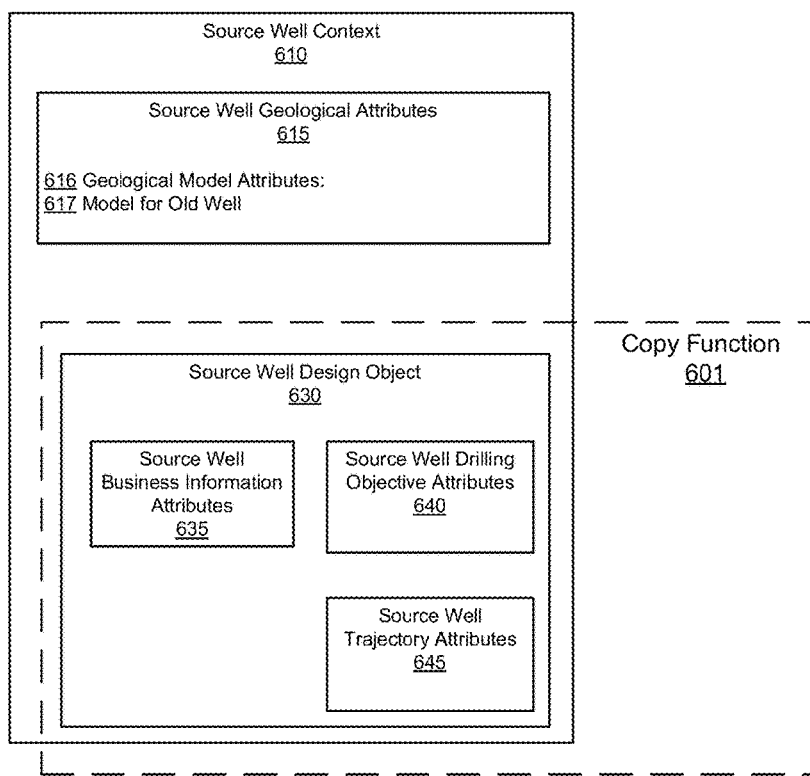
FIG. 6.1

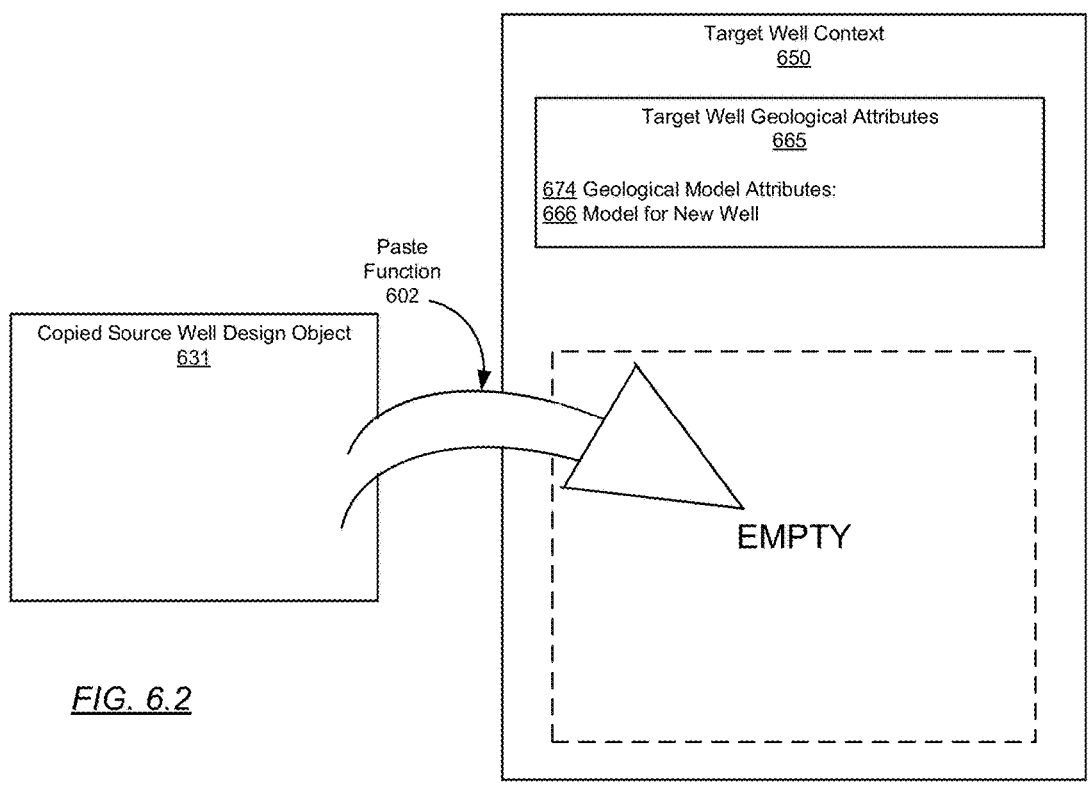
FIG. 6.2

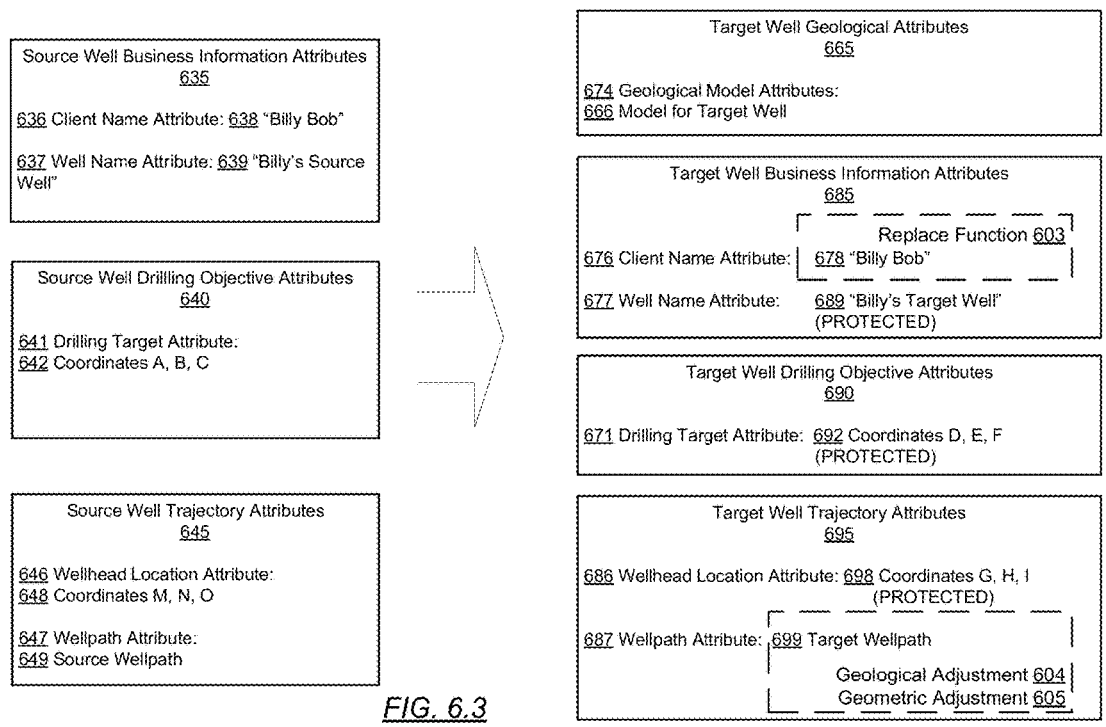
FIG. 6.3

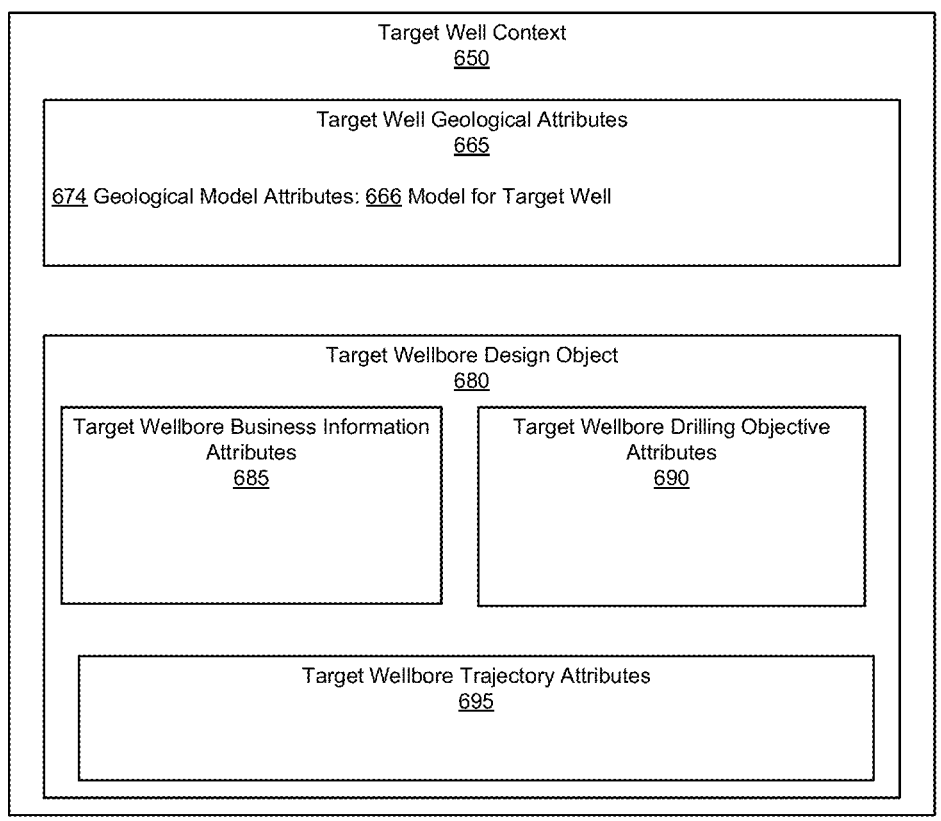
FIG. 6.4

METHOD AND SYSTEM FOR GENERATING OILFIELD OBJECTS

CROSS-REFERENCE TO RELATED APPLICATIONS

This application claims priority to U.S. Provisional Patent Application Ser. No. 62/058,878, which was filed on Oct. 2, 2014, and is incorporated herein by reference.

BACKGROUND

Copy-and-paste functionality may be provided by various software products such as word processor applications that allow text and other objects to be copied from one document to another. In the software products, options may be provided for processing an object, e.g., the paragraph style of selected text may be ignored, while the text may be transferred to a target document. Thus, the paragraph style of the target document may be applied to the pasted text. In such an example, the ignored information is information outside the content of the text.

SUMMARY

In general, in one aspect, embodiments relate to a method. The method includes obtaining, from a graphical user interface (GUI), a selection of a first oilfield object. The first oilfield object defines a portion of a first wellbore design. The method further includes determining a target context of a second wellbore design. The method further includes obtaining, from the first oilfield object, source oilfield data describing the portion of the first wellbore design. The method further includes adjusting the source oilfield data, according to the target context of the second wellbore design, to obtain target oilfield data for the second wellbore design. The method further includes generating, using the target oilfield data, a second oilfield object within the target context. The method further includes presenting, within the GUI, the second oilfield object.

Other aspects of the technology will be apparent from the following description and the appended claims.

BRIEF DESCRIPTION OF DRAWINGS

FIGS. 6.1, 6.2, 6.3, and 6.4 show an example in accordance with one or more embodiments of the technology.

DETAILED DESCRIPTION

Figure 1:
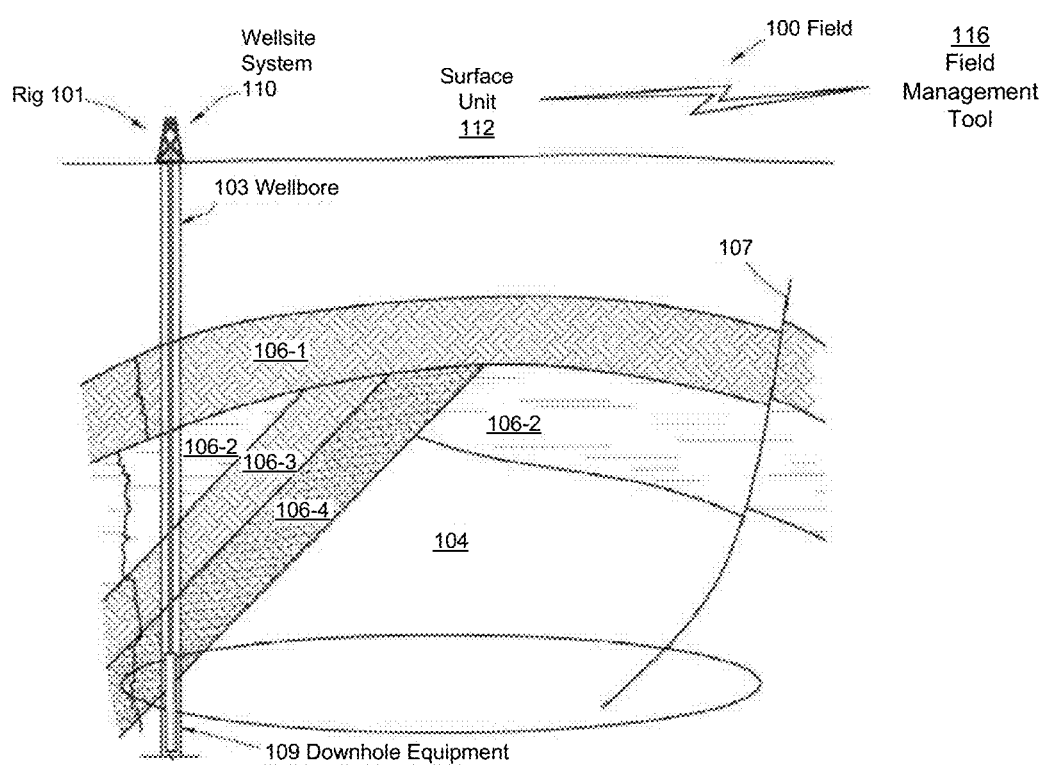
FIGS. 1 and 2 show schematic diagrams in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology include a method, a system, and a non-transitory computer readable medium for generating various oilfield objects within a target context. In particular, one or more embodiments are directed to selecting, either by a user or automatically by a software application, a source oilfield object that defines a portion of a first wellbore design. Thus, the source oilfield object may be used to generate a target oilfield object for a different wellbore design. As such, oilfield data from the source oilfield object may be adjusted accordingly to make the target oilfield object compatible with the target context. Accordingly, the source oilfield object and/or the target oilfield object may be presented within a graphical user interface according to their respective contexts.

FIG. 1 depicts a schematic view, partially in cross section, of a field (100) in which one or more embodiments may be implemented. In one or more embodiments, the field may be an oilfield. In other embodiments, the field may be a different type of field. In one or more embodiments, one or more of the modules and elements shown in FIG. 1 may be omitted, repeated, and/or substituted. Accordingly, embodiments should not be considered limited to the specific arrangements of modules shown in FIG. 1.

As shown in FIG. 1, the subterranean formation (104) may include several geological structures (106-1 through 106-4) of which FIG. 1 provides an example. As shown, the formation may include a sandstone layer (106-1), a limestone layer (106-2), a shale layer (106-3), and a sand layer (106-4). A fault line (107) may extend through the formation. In one or more embodiments, various survey tools and/or data acquisition tools are adapted to measure the formation and detect the characteristics of the geological structures of the formation. Further, as shown in FIG. 1, the wellsite system (110) is associated with a rig (101), a wellbore (103), and other field equipment, and is configured to perform wellbore operations such as logging, drilling, fracturing, production, or other applicable operations. The wellbore (103) may also be referred to as a borehole.

In one or more embodiments, the surface unit (112) is operatively coupled to a field management tool (116) and/or the wellsite system (110). In particular, the surface unit (112) is configured to communicate with the field management tool (116) and/or the wellsite system (110) to send commands to the field management tool (116) and/or the wellsite system (110) and to receive data therefrom. For example, the wellsite system (110) may be adapted for measuring downhole properties using logging-while-drilling ("LWD") tools to obtain well logs and for obtaining core samples. In one or more embodiments, the surface unit (112) may be located at the wellsite system (110) and/or remote locations. The surface unit (112) may be provided with computer facilities for receiving, storing, processing, and/or analyzing data from the field management tool (116), the wellsite system (110), or another part of the field (100). The surface unit (112) may also be provided with or functionally for actuating mechanisms at the field (100). The surface unit (112) may then send command signals to the field (100) in response to data received, for example, to control and/or optimize various field operations described above.

During the various oilfield operations at the field, data is collected for analysis and/or monitoring of the oilfield operations. Such data may include, for example, subterranean formation, equipment, historical and/or other data. Static data relates to, for example, formation structure and geological stratigraphy that define the geological structures of the subterranean formation. Static data may also include data about the wellbore, such as inside diameters, outside diameters, and depths. Dynamic data relates to, for example, fluids flowing through the geologic structures of the subterranean formation over time. The dynamic data may include, for example, pressures, fluid compositions (e.g. gas oil ratio, water cut, and/or other fluid compositional information), choke positions of down hole flow control valves, and other information that may be monitored via downhole equipment (109) such as downhole sensors. The downhole sensors may include sensors which are part of the down hole flow control valves and sensors, e.g. pressure and temperature sensors, which are located separately in the various well zones and/or other well locations.

The static and dynamic data collected from the wellbore and the oilfield may be used to create and update a three dimensional model of the subsurface formations. Additionally, static and dynamic data from other wellbores or oilfields may be used to create and update the three dimensional model. Hardware sensors, core sampling, and well logging techniques may be used to collect the data. Other static measurements may be gathered using downhole measurements, such as core sampling and well logging techniques. Well logging involves deployment of a downhole tool into the wellbore to collect various downhole measurements, such as density, resistivity, etc., at various depths. Such well logging may be performed using, for example, a drilling tool and/or a wireline tool, or sensors located on downhole production equipment. Once the well is formed and completed, fluid flows to the surface using production tubing and other completion equipment. As fluid passes to the surface, various dynamic measurements such as fluid flow rates, pressure, and composition may be monitored. These parameters may be used to determine various characteristics of the subterranean formation.

In one or more embodiments, the data is received by the surface unit (112), which is communicatively coupled to the field management tool (116). Generally, the field management tool (116) is configured to analyze, model, control, optimize, or perform other management tasks of the aforementioned field operations based on the data provided from the surface unit (112). Although the surface unit (112) is shown as separate from the field management tool (116) in FIG. 1, in other examples, the surface unit (112) and the field management tool (116) may also be combined.

In the vertical well shown in FIG. 1, a lateral of the vertical well is the borehole. Although FIG. 1 shows a vertical well, one or more embodiments may apply to a horizontal well and/or a multilateral well that extends horizontally through one or more subsurface formations. For example, in a horizontal well, the lateral may correspond to the single borehole trajectory. The single lateral of the horizontal or vertical well may have multiple zones isolated by packers and down hole flow control valves. In a multilateral well, multiple laterals may exist.

Figure 2:
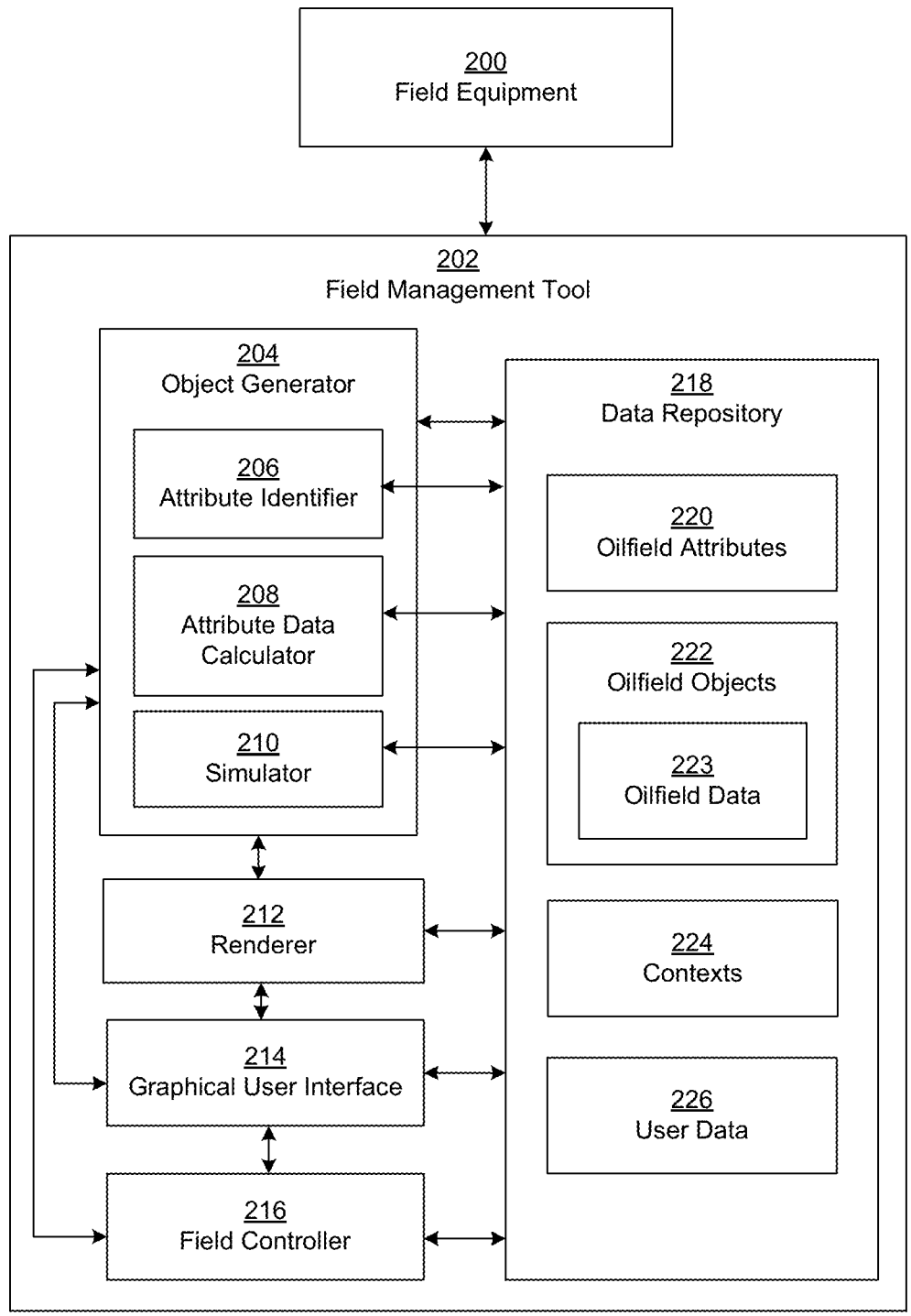

FIG. 2 shows a schematic diagram of a system in accordance with one or more embodiments of the technology. In FIG. 2, lines represent operable connections between components. In other words, the operable connections represent at least some of the components that may share data and commands. The operable connections may be direct or indirect, through a network, through shared storage, through application programming interface calls, intermittent or semi-permanent, or through any other type of connection. As shown in FIG. 2, field equipment (200) is operatively connected to a field management tool (202). The field equipment (200) may correspond to any of the hardware and other equipment discussed above with reference to FIG. 1. The field management tool (202) may correspond to the field management tool discussed above with reference to FIG. 1. While the field management tool (202) is described in use with various activities relating to drilling in FIG. 1, the field management tool (202) may further be used with respect to various activities in preparation to drilling, e.g., surveying a possible wellsite. Thus, the field management tool (202) may be used with respect to activities performed prior to actual drilling.

The field management tool (202) may include a data repository (218). In one or more embodiments, the data repository (218) is any type of storage unit and/or device (e.g., a file system, database, collection of tables, or any other storage mechanism) for storing data. Further, the data repository (218) may include multiple different storage units and/or devices. The multiple different storage units and/or devices may or may not be of the same type or located at the same physical site.

The data repository (218) may include functionality to store oilfield attributes (220), oilfield objects (222), contexts (224), and user data (226) in accordance with one or more embodiments. In particular, the oilfield attributes (220) may describe various data types associated with the contexts (224) and oilfield objects (222). In one or more embodiments, for example, the oilfield attributes (220) classify data associated with a wellsite. Thus, the oilfield attributes (220) may represent geological properties within a wellsite, such as the physical properties predicted using a geological model. In one or more embodiments, the oilfield attributes (220) may be various wellbore design properties, such as user information properties (e.g., the owner's name of the wellbore, the name assigned to the wellbore), various drilling objective properties (e.g., physical coordinates of one or more target locations that the wellbore intersects), various trajectory properties (e.g., wellhead location, coordinates describing a wellpath, and various kickoff properties, such as kickoff point, kickoff inclination, maximum allowable curvature, etc.), and various mud plan properties (e.g., drilling fluid specifications, etc.).

In one or more embodiments, oilfield objects (222) are data structures that represent various oilfield entities according to the oilfield attributes (220). Specifically, an oilfield entity may be a physical entity, such as a geological entity, located at a wellsite. Example oilfield entities may include a wellbore, a reservoir, a physical surface, etc. Thus, examples of oilfield objects may include wellbore design objects, surface objects, reservoir objects, a bottom hole assembly object, a casing design object, a submersible pump object, a borehole trajectory design object, and a historical days vs. depth curve object (i.e., from a previously drilled well).

Furthermore, in one or more embodiments, an oilfield entity may be divided into sub-entities. For example, a wellbore design may include sub-entities such as a wellhead location, a wellpath through the subsurface, and one or more target drilling locations. Thus, each sub-entity may be represented by a unique corresponding oilfield object.

In one or more embodiments, oilfield objects (222) are configured to store oilfield data (223) according to the oilfield attributes (220). While an oilfield attribute may be a data type, the oilfield data (223) may provide a data value corresponding to that data type. For example, one oilfield attribute may correspond to a type of geological property of a wellsite, while the oilfield data for that oilfield attribute provides information regarding that type of geological property. As such, the oilfield data (223) may also include design information regarding a wellbore design or other oilfield services at the wellsite, and/or user information associated with human entities associated with the wellsite, such as a drilling company or owner of the wellsite, or data that describes other oilfield entities. In one or more embodiments, oilfield objects (222) may include oilfield data acquired during a survey, e.g., a seismic survey or through other sensing and/or observation techniques.

In one or more embodiments, oilfield objects (222) may include software property objects that describe software values associated with an oilfield design application (e.g., a software application configured to design and/or model entities associated with a wellsite), such as data versions and/or display parameters of the oilfield design application. In one or more embodiments, for example, a software property object may provide login information, version information and/or display information (e.g., user preferences on how to display a well as part of a model). In one or more embodiments, oilfield entities include non-wellsite entities. For example, the oilfield entities may represent various aspects of an oilfield design application, such as through a version object (i.e., an oilfield object that displays the version number of an oilfield design application) or a user history object (i.e., provides a record of a user's changes and edits to a file for an oilfield design application).

In one or more embodiments, the oilfield objects (222) are defined within a software framework that provides abstractions to store data within the oilfield objects (222). For example, the oilfield objects (222) may be based on predefined object classes that facilitate modeling and simulation using the oilfield objects (222). Thus, in a particular software framework, an object class may encapsulate a module of reusable code and associated data structures each with corresponding oilfield attributes. In one or more embodiments, object classes are used to instantiate oilfield object instances for use by a software program, a script, etc. For example, a borehole class may define oilfield objects that represent boreholes based on well data. In one or more embodiments, the software framework is a seismic-to-simulation software framework that provides components to a user within a graphical user interface for optimizing exploration and development operations. As such, the components may output information for use in increasing reservoir performance, for example, through assisting asset team productivity. Through use of the seismic-to-simulation software framework, various professionals (e.g., geophysicists, geologists, and reservoir engineers) may develop collaborative workflows and integrate operations to streamline processes.

In one or more embodiments, the contexts (224) describe locations where an oilfield object is designated to be generated. In particular, a context may be a software file for an oilfield design application that a user designates as a place to paste a copied oilfield object. For example, in regard to an oilfield design application, a layout of a wellsite may be a context for a wellbore object pasted into the layout of the wellsite. In another example, a context may be a wellsite that includes various oilfield objects, such as reservoir object with oilfield attributes describing the shape and properties of a reservoir, a wellbore design object with oilfield attributes describing the trajectory of a wellbore through the reservoir, and a wellsite label object that describes business information associated with the wellsite (e.g., the owner of the wellsite).

In one or more embodiments, the contexts (224) provide various background attributes relating to one or more oilfield objects presented within a software application. These background attributes may be used to determine oilfield data for generating oilfield objects. Specifically, the background attributes may be various oilfield attributes that affect how oilfield objects are displayed within a particular context or other parameters that affect data found in oilfield objects within the context. In particular, a context may use the background attributes to provide a degree of uniformity among oilfield objects located with the particular context. Thus, the background attributes may include oilfield data that affects the type and range of oilfield data values that an oilfield object may have in that context. For example, the background attributes may correspond to wellsite geology, desired wellbore geometry, drilling targets or other factors that relate to a particular oilfield object. Other examples of contexts may include the geology through which a well passes, a drilling rig and associated equipment used for drilling a well, a skill set and qualifications of a person who will perform an operation, e.g., the qualifications of a directional driller, reservoir properties, and geomechanical rock properties. In one or more embodiments, a context is a file for an oilfield design application. Thus, the contexts (224) may provide information for generating various oilfield objects within the context, such as wellsite information relating to a physical layout of a wellsite.

User data (226) may describe information provided by one or more users associated with a wellsite. Specifically, in one or more embodiments, user data (226) includes data stored outside of the oilfield objects (226), but which may be used to generate the oilfield objects (222). As such, users may assign various data values to the oilfield attributes associated with the oilfield objects (222). Thus, the user data (226) may also be oilfield data. In particular, user data (226) may include identification information, such as the name of a client that owns a wellsite, the names of various wellbores at the wellsite, or other identification information. User data (226) may also include business information, such as a user's business address, mailing address, business location, etc. that is associated with an oilfield object.

As shown in FIG. 2, the field management tool (202) further includes an object generator (204), a renderer (212), a graphical user interface (214), and a field controller (216). Each of these components is described below.

In one or more embodiments, the object generator (204) corresponds to hardware, software, firmware, or a combination thereof that includes functionality to generate an oilfield object. In particular, the object generator (204) may generate the oilfield object within a context using oilfield data associated with that context. In one or more embodiments, the object generator (204) copies an oilfield object from a source context and pastes the copied oilfield object into a target context. Specifically, the copied oilfield object may be described as the source oilfield object and the original context that includes the source oilfield object may be the source context. Conversely, the pasted oilfield object may be described as the target oilfield object while the destination of the target oilfield object may be the target context. Furthermore, oilfield attributes associated with the source oilfield object may be described as source oilfield attributes, while oilfield attributes associated with the target oilfield object may be described as target oilfield attributes. The source context and the target context may be files for a single oilfield design application (e.g., a computer-aided design (CAD) software), or the source context and target context may correspond to files for different oilfield design applications.

In particular, copy-and-paste functionality of oilfield objects may be similar to the functionality provided by various software applications such as word processors that may allow text and other objects to be copied from one document to another document. However, simple copy-and-paste functionality may not produce an oilfield object that is compatible with a target context due to differences between the source context and a target context, e.g., in respect to geology, desired wellbore geometry, drilling targets or other factors.

For example, the object generator (204) may ignore various oilfield attributes within a source object, while transferring and/or adjusting data values for other oilfield attributes from the source object to the target context. In oilfield software, examples of copy-and-paste operations may be used to ease a data entry in a software application's user interface (e.g., copying text from one data field to another) or to move or make a copy of an entire object. In one or more embodiments, the object generator (204) produces an object that is compatible with a target context by adjusting a source oilfield object for differences in the target context such as geology, desired wellbore geometry, drilling targets or other factors.

In one or more embodiments, the object generator (204) includes an attribute identifier (206), an attribute data calculator (208), and/or a simulator (210). While the attribute identifier (206), the attribute data calculator (208), and the simulator (210) are shown located in the object generator (204) in FIG. 2, each component may be located outside the object generator (204). In one or more embodiments, the attribute identifier (206) is configured to determine which types of oilfield attributes are located within a particular oilfield object and/or context. In particular, the attribute identifier (206) may select which oilfield attributes from a preexisting oilfield object are to be used in a newly generated oilfield object. In one or more embodiments, for example, if a preexisting oilfield object in a source context is copied by a user, the attribute identifier (206) automatically decides which oilfield attributes from the preexisting oilfield object are used in the newly generated oilfield object.

In one or more embodiments, the attribute data calculator (208) obtains and/or generates oilfield data for an oilfield object. For example, if an oilfield object is generated based on a preexisting oilfield object located in a source context, the attribute data calculator (208) may obtain oilfield data from the preexisting oilfield object for use in the newly generated oilfield object. In one or more embodiments, the attribute data calculator (208) generates adjusted oilfield data based on related oilfield attributes within a target context.

In one or more embodiments, the simulator (210) models oilfield data for an oilfield object and/or context. In one or more embodiments, for example, the simulator (210) performs a geometric interpolation and/or extrapolation of data for various oilfield attributes that are associated with an oilfield object. For example, the simulator (210) may adjust the trajectory of a wellbore within the subsurface based on various drilling targets within the subsurface. Thus, the simulator (210) may interpolate a wellpath between the drilling targets. In one or more embodiments, the simulator (210) generates a geological interpolation and/or extrapolation of data for various oilfield attributes associated with an oilfield object. Thus, the simulator (210) may adjust oilfield data of an oilfield object based on geological properties, such as the shape of bedding layers, the type of rock, etc. In one or more embodiments, the simulator (210) operates in conjunction with a software framework.

In one or more embodiments, the simulator (210) constructs one or more geological models of a geologic environment to simulate behavior within the geologic environment (e.g., responsive to one or more acts, whether natural or artificial). Furthermore, the simulator (210) may include functionality provided by an oilfield simulator, such as with a reservoir simulator. In one or more embodiments, for example, the simulator (210) includes functionality to implement one or more numerical simulation methods, such as a meshless technique to solve one or more equations. In another example, one or more reservoirs may be simulated with respect to one or more enhanced recovery techniques (e.g., consider a thermal process such as SAGD, etc.).

In one or more embodiments, a graphical user interface (GUI) (214) is connected to the field controller (216) and the renderer (212), and may be configured to interact with a user. Further, the GUI (214) may include functionality to receive information about oilfield attributes (220), oilfield objects (222), contexts (224), user data (226), design specifications, and/or various field operations. The GUI (214) may further be configured to display output of the object generator (204), the renderer (212), the field controller (216), or a combination thereof.

In one or more embodiments, the renderer (212) corresponds to hardware, software, firmware, or a combination thereof that includes functionality to display one or more of the oilfield objects (222) and/or contexts (224) within a GUI (214). Specifically, the renderer (212) may produce a virtual representation within the GUI (214) of the oilfield entities associated with an oilfield object. In particular, the renderer (212) may construct or reconstruct an oilfield entity using the simulator (210) and oilfield data associated with oilfield attributes obtained from the oilfield object and/or context. Furthermore, the renderer (212) may also output a virtual representation of a particular context with the GUI (214). Thus, both oilfield objects (222) and their corresponding contexts (224) may be displayed together to a user. For example, if the oilfield object is a wellbore design object and the context is a wellsite context, the renderer (212) may present the wellbore design object within a wellsite context similar to what is shown in FIG. 1, or in more detail with better graphics and with more oilfield data displayed. In one or more embodiments, the renderer (212) outputs a virtual representation of an oilfield object and/or context within a layout for various software application components that have a common look and feel.

In one or more embodiments, the data repository (218), the GUI (214) and the object generator (204) are operably connected to a field controller (216). The field controller (216) may include functionality to collect data from a wellsite and perform various tests on the wellsite. In one or more embodiments, the field controller (216) may further include functionality to obtain results of processing and send commands to the field equipment. In other words, the field controller (216) may include functionality to control the equipment at the field, with or without human interaction.

Figure 3:
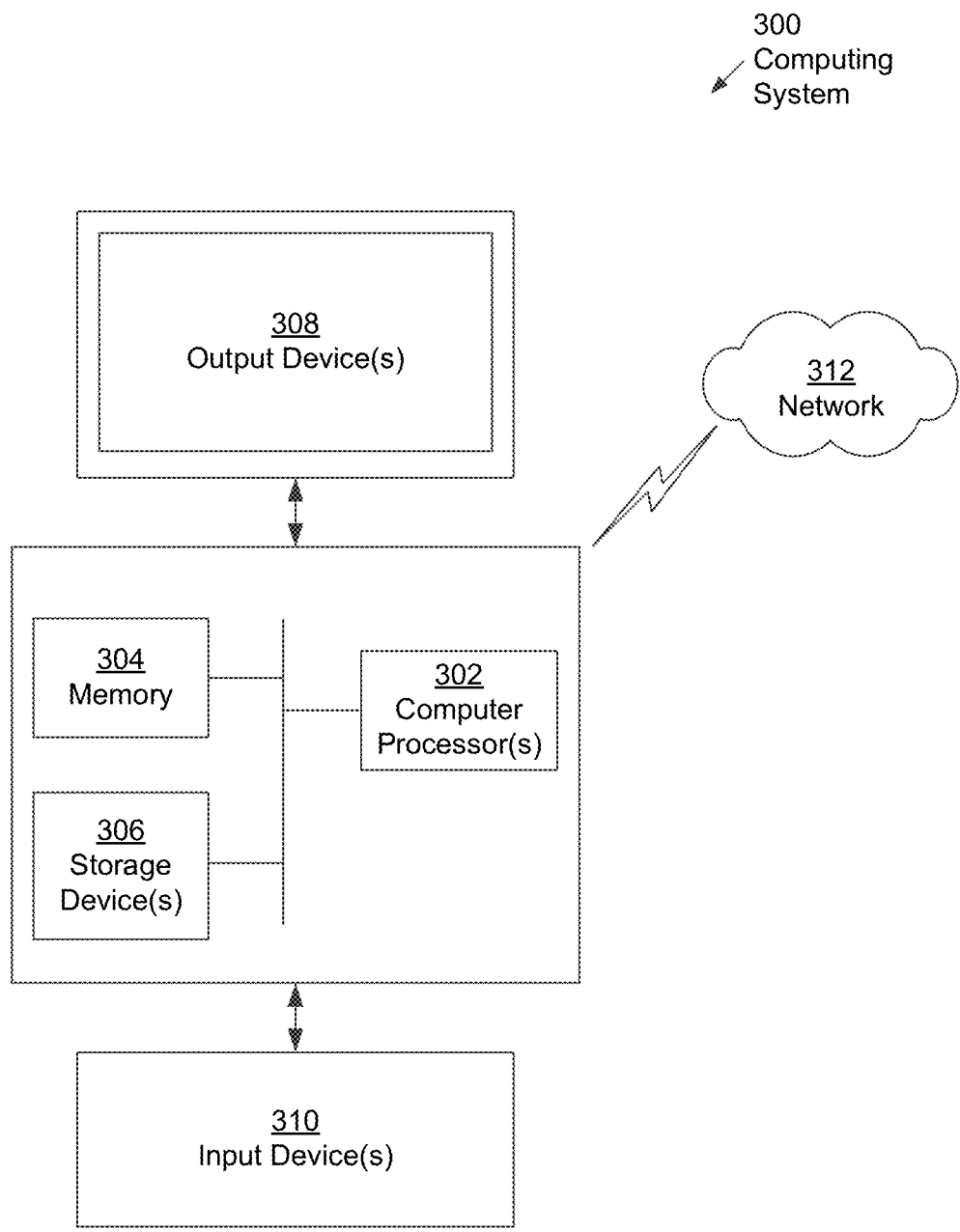
FIG. 3 shows a computing system in accordance with one or more embodiments of the technology.

Embodiments of the technology may be implemented on a computing system. For example, the field management tool (202) in FIG. 2 may be implemented using a computing system (300) as describe with respect to FIG. 3. Any combination of mobile, desktop, server, embedded, or other types of hardware may be used. For example, as shown in FIG. 3, the computing system (300) may include one or more computer processor(s) (302), associated memory (304) (e.g., random access memory (RAM), cache memory, flash memory, etc.), one or more storage device(s) (306) (e.g., a hard disk, an optical drive such as a compact disk (CD) drive or digital versatile disk (DVD) drive, a flash memory stick, etc.), and numerous other elements and functionalities. The computer processor(s) (302) may be an integrated circuit for processing instructions. For example, the computer processor(s) may be one or more cores, or micro-cores of a processor. The computing system (300) may also include one or more input device(s) (310), such as a touchscreen, keyboard, mouse, microphone, touchpad, electronic pen, or any other type of input device. Further, the computing system (300) may include one or more output device(s) (308), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (300) may be connected to a network (312) (e.g., a local area network (LAN), a wide area network (WAN) such as the Internet, mobile network, or any other type of network) via a network interface connection (not shown). The input and output device(s) may be locally or remotely (e.g., via the network (312)) connected to the computer processor(s) (302), memory (304), and storage device(s) (306). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Further, one or more elements of the aforementioned computing system (300) may be located at a remote location and connected to the other elements over a network (312). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

Figure 4:
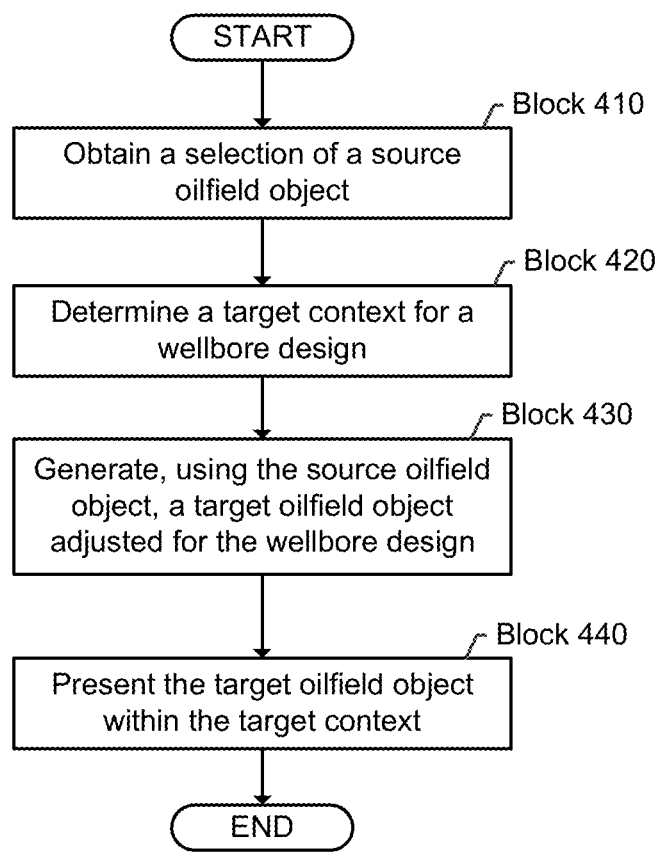
FIGS. 4-5 show flowcharts in accordance with one or more embodiments of the technology.
Figure 5:
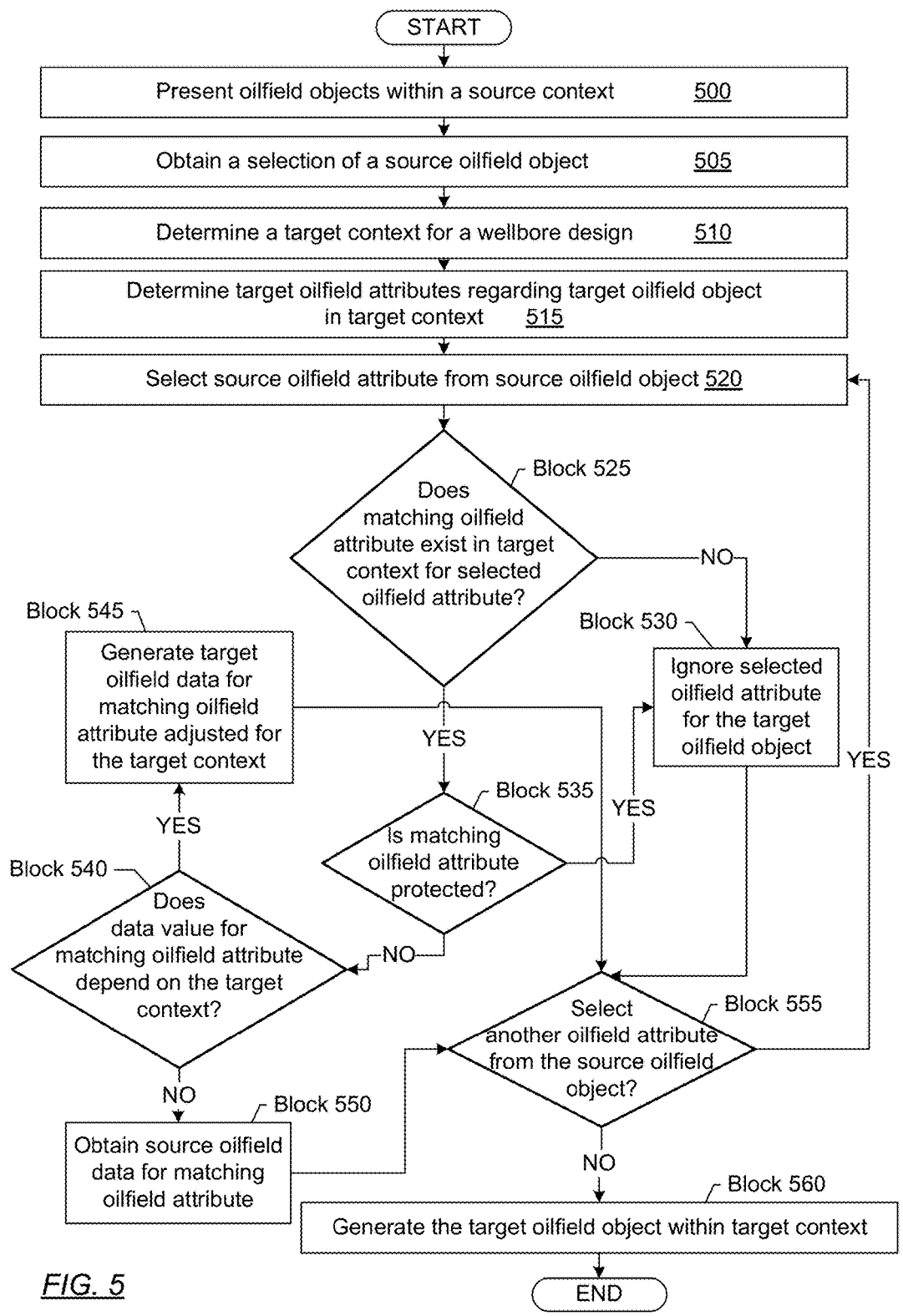

FIGS. 4-5 show flowcharts in accordance with one or more embodiments. While the various blocks in this flowchart are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven in accordance with one or more embodiments. By way of an example, determination blocks may not require a processor to process an instruction unless an interrupt is received to signify that condition exists in accordance with one or more embodiments. As another example, determination blocks may be performed by performing a test, such as checking a data value to test whether the value is consistent with the tested condition in accordance with one or more embodiments.

Turning to FIG. 4, in Block 410, a selection of a source oilfield object is obtained in accordance with one or more embodiments. In one or more embodiments, for example, various oilfield objects in a particular source context are displayed within a graphical user interface. Thus, a user may use various input commands associated with the graphical user interface (e.g., a mouse cursor, etc.) to choose one of the oilfield objects as the source oilfield object for the selection in Block 410. In one or more embodiments, multiple oilfield objects are included in the selection. In one or more embodiments, a particular oilfield object is automatically selected, e.g., by an object generator from a predetermined template for an oilfield design application.

In Block 420, a target context is determined for a wellbore design in accordance with one or more embodiments. In one or more embodiments, for example, a user selects a oilfield design application for designing a wellbore. Within a graphical user interface of the oilfield design application, the user may select a wellsite template or an empty wellsite layout. Thus, the wellsite template or the empty wellsite may be the target context determined in block 420. In one or more embodiments, the target context is an existing wellsite layout, e.g., to copy a wellbore object to multiple locations at the particular wellsite.

In Block 430, a target oilfield object (also called a "pasted object") is generated, using the source oilfield object, which is adjusted for the wellbore design in accordance with one or more embodiments. In one or more embodiments, the source oilfield object is copied from a source context, and pasted in the target context from Block 420. The target context may have various target oilfield attributes associated with the target oilfield context. For example, before the source oilfield object is pasted into a target context, other oilfield objects may already be located within the target context. Thus, an object generator may adjust the source oilfield object based on oilfield attributes of the other oilfield objects accordingly to fit the target oilfield object to the target context. In one or more embodiments, a user replaces a preexisting oilfield object in the target context with a similar oilfield object from a different context. For example, if the user wants to modify a current wellbore design in the target context with a wellbore design from a different context, the user may copy a different wellbore design from the different context and replace the current wellbore design with the different one.

In one or more embodiments, an object generator automatically populates a target context with various default oilfield objects. For example, when a user requests a new wellsite template, an oilfield design application may preload various oilfield objects into the new wellsite template.

In Block 440, a target oilfield object is presented within a target context in accordance with one or more embodiments. The target oilfield object from Block 430 may be presented in a graphical user interface that displays both the target oilfield object alongside the target context from Block 420. An oilfield object may have a graphical representation, e.g., a wellbore design may be displayed as a cross-sectional view of a wellbore. In one or more embodiments, the target context may include hidden oilfield objects that affect the oilfield attributes of displayed oilfield objects, but which are not directly presented in the graphical user interface. For example, a geological model object may be a hidden oilfield object which describes various geological properties of a wellsite, such as porosity. However, the geological model object may not be directly presented in the graphical user interface.

In one or more embodiments, a renderer presents the target oilfield object in a graphical user interface to a user. For example, the renderer triggers an event to a computer processor, which notifies a software application operating on a computing device to present the target oilfield object. The event may define how the target oilfield object is display and any other settings.

Turning to FIG. 5, in Block 500, various oilfield objects are presented within a source context in accordance with one or more embodiments. An oilfield design application may identify that an oilfield object is a particular type, and thus display the oilfield object according to that type. In one or more embodiments, a software framework may provide rules and parameters on how to display various oilfield objects. In one or more embodiments, a renderer may obtain oilfield data from the oilfield objects in Block 500 and display the oilfield data according to parameters defined within the renderer.

In Block 505, a selection of a source oilfield object is obtained in accordance with one or more embodiments. In one or more embodiments, for example, a user selects one or more of the oilfield objects presented within a source context. The user may use a mouse cursor to choose an oilfield object, while using various oilfield design application menu commands to copy the oilfield object. Thus, the oilfield design application may obtain a selection of the oilfield object from the user. In one or more embodiments, the oilfield design application uses a template to determine automatically a selection of an oilfield object, e.g., to paste into a target context.

In one or more embodiments, an object generator obtains the selection of the source oilfield object. For example, a user may trigger an event using a graphical user interface to a computer processor, where the event notifies a software application operating on a computing device to select the source oilfield object for the selection.

In Block 510, a target context is determined for a wellbore design in accordance with one or more embodiments. For example, a user may input a selection into a oilfield design application for a wellsite context or other type of context. For example, the target context may be a new context generated by the oilfield design application, or the target context may be a previously-saved context that is stored in a computing device. In one or more embodiments, a user inputs a desired type of project (e.g., a template for designing a wellbore at the bottom of the ocean) and the oilfield design application automatically selects the target context for the desired project accordingly.

In one or more embodiments, an object generator determines the target context. For example, in response to obtaining the selection in Block 505, the object generator may trigger an event to a computer processor, where the event notifies a software application operating on a computing device that a particular target context is to be used in Block 515-560 below. In one or more embodiments, a user selects a target context with a graphical user interface, and the object generator obtains the selection of the target context. In response to the user's selection, the object generator may trigger an event to the computer process that determines a target context according to the user's selection.

In Block 515, various target oilfield attributes are determined for a target oilfield object in a target context in accordance with one or more embodiments. In one or more embodiments, the attribute identifier analyzes the target context to determine the types of oilfield attributes that may be stored within an oilfield object that is similar to the source oilfield object from Block 505. For example, the attribute identifier may identify which oilfield attributes have existing data values within the target context and/or which oilfield attributes have not been assigned a data value.

In Block 520, a source oilfield attribute is selected from a source oilfield object in accordance with one or more embodiments. In one or more embodiments, the source oilfield attributes from Block 505 are selected iteratively through Blocks 520-555 for generating a target oilfield object in Block 560. In one or more embodiments, an attribute identifier determines which oilfield attributes of a target oilfield object lack data values, and the attribute identifier selects those oilfield attributes accordingly in Block 520.

In Block 525, a determination is made whether a matching oilfield attribute exists in target context for the selected oilfield attribute in accordance with one or more embodiments. In one or more embodiments, a source context and a target context includes different types of oilfield attributes. For example, one oilfield attribute may be found in both the source context and the target context, while another oilfield attribute may be found in the source context but not the target context. Thus, an attribute identifier may analyze the target context to determine whether the source oilfield attribute selected in Block 520 matches any target oilfield attribute. In one or more embodiments, where the selected oilfield attributes lacks a matching oilfield attribute within the target context, the selected oilfield attribute is determined to be incompatible with the target context. Thus, in one or more embodiments, merely a portion of the oilfield data source within the source oilfield object is used to generate a target oilfield object.

When it is determined that a matching oilfield attribute exists, the process may proceed to Block 535. When it is determined that the selected oilfield attribute lacks a matching oilfield attribute, the process may proceed to Block 530.

In Block 530, a selected oilfield attribute is ignored for a target oilfield object in accordance with one or more embodiments. In one or more embodiments, an object generator ignores a data value associated with the selected oilfield attribute in generating a target oilfield object. For example, the data may be discarded. In one or more embodiments, a corresponding oilfield attribute in the target oilfield object is substituted with default data or data from an oilfield attribute that already exists within the target context.

In Block 535, a determination is made whether a matching oilfield attribute is protected in accordance with one or more embodiments. A protected oilfield attribute may have a designation, either in a software framework or by an object generator, that data for an oilfield attribute may not be replaced by a source oilfield object. For example, during the copy-and-pasting of an oilfield object within a target context, oilfield attributes may be classified as non-transferable between objects. In one or more embodiments, an object class for an oilfield object designates various oilfield attributes for that oilfield object as being generated with a specific default data value or a data value from a particular source. In one or more embodiments, an oilfield attribute may be classified as protected within a software framework.

If the matching oilfield attribute lacks protection, data from the selected oilfield attribute from Block 520 may be used to generate a target oilfield object in Block 560 below. When it is determined that the matching oilfield attribute is protected, the process may proceed to Block 535. When it is determined that the matching oilfield attribute lacks protection, the process may proceed to Block 540.

In Block 540, a determination is made whether a data value for a matching oilfield attribute depends on a target context in accordance with one or more embodiments. Specifically, a data value for a target oilfield attribute may depend on data regarding the target context or other oilfield objects found within the target context. Thus, when such a dependency exists, a copy-and-paste function may not generate oilfield attributes directly from data in a source oilfield object. Therefore, an object generator may adjust data accordingly as described in Block 545 below. On the other hand, if the data value for the target oilfield attribute is independent of any data regarding the target context, data from the source oilfield object may be transferred directly into the target oilfield object.

In one or more embodiments, the data from the source oilfield object is verified whether the data still applies to the target context. In one or more embodiments, for example, a data value for a matching oilfield attribute is analyzed as whether the underlying basis for the data value is still applicable (e.g., if the source oilfield attribute is based on legacy survey data where the survey occurred years earlier, the accuracy of the legacy survey data may have expired). When it is determined that a data value for a matching oilfield attribute is independent of the target context, the process may proceed to Block 550. When it is determined that the data value for the matching oilfield attribute depends on data values associated with the target context, the process may proceed to Block 545.

In Block 545, target oilfield data is generated for the matching oilfield attribute where the target oilfield data is adjusted for the target context in accordance with one or more embodiments. In one or more embodiments, a target oilfield data is computed for the matching oilfield attribute as to be compatible with the target context. The target oilfield data may be generating using the source oilfield data, or may be generated independently. In one or more embodiments, an object generator calculates the target oilfield data using oilfield data from the source context, the target context, and/or the target oilfield object to be generated (e.g., data may be used that was previously assigned to a target oilfield attribute in a previous iteration of Block 545 or Block 550). In one or more embodiments, an object generator determines a dependency between the target oilfield data and related oilfield attributes found in the source context, the target context, and/or the target oilfield object. Using the dependency, target oilfield data may be obtained from the related oilfield attributes accordingly for the matching oilfield attribute.

In one or more embodiments, the target oilfield data is generated from a simulation. For example, if the matching oilfield attribute corresponds to an oilfield attribute for a wellpath, the target oilfield data may be generated using a geological model of a wellsite in the target context as well as data from other oilfield objects in the target context, such as a wellhead object, drilling target objects, etc. Thus, for a simulation, an object generator may simulate an adjusted wellpath from a source wellpath object using data in the source wellpath object that is adjusted for the geological model and other oilfield attributes in the target context.

In one or more embodiments, an object generator adjusts the source oilfield data from the source oilfield object to the target context. For example, in response to determining that the matching oilfield attribute does depend on the target context, the object generator may trigger an event to a computer processor, where the event notifies a software application operating on a computing device to adjust oilfield data from the source oilfield object according to the type of dependency with the target context. For example, the object generator may identify a geological and/or geometric dependency regarding the matching oilfield attribute. Thus, the event may trigger a simulator to determine target oilfield data adjusted according to the type of dependency.

In Block 550, source oilfield data is obtained for a matching oilfield attribute in accordance with one or more embodiments. Specifically, the target oilfield object may be generated using oilfield data from the source oilfield object in Block 505. In other words, an object generator may obtain oilfield data within the data structure provided by the source oilfield object, and assign the matching oilfield attribute a data value corresponding to that oilfield data. Thus, the matching oilfield attribute in the target oilfield object and the selected oilfield attribute in the source oilfield object may have the same data value.

In one or more embodiments, an object generator obtains the source oilfield data from the source oilfield object. For example, in response to determining that the matching oilfield attribute does not depend the target context, the object generator may trigger an event to a computer processor, where the event notifies a software application operating on a computing device to obtain oilfield data from the source oilfield object that corresponds to the matching oilfield attribute.

In Block 555, a determination is made whether to select another source oilfield attribute from a source oilfield object in accordance with one or more embodiments. Specifically, if the target oilfield object has been assigned data oilfield data through some iteration of Blocks 525-555, the process may proceed to Block 560. When it is determined that oilfield attributes exist for the target oilfield object without accompanying oilfield data, the process may proceed to Block 520.

In Block 560, a target oilfield object is generated within a target context in accordance with one or more embodiments. Using oilfield data acquired for matching oilfield attributes from various iterations of Blocks 520-555, the target oilfield object may be generated accordingly. The target oilfield object may be placed within the target context in connection with or alongside other oilfield objects located within the target context.

In one or more embodiments, an object generator generates the target oilfield object within the target context. For example, upon going through the oilfield attributes within the source oilfield object, the object generator may trigger an event to a computer processor, where the event notifies a software application operating on a computing device to generate a target oilfield object accordingly.

Thus, in one or more embodiments, Block 520-555 are used to generate a new oilfield object. However, in one or more embodiments, Blocks 520-555 are used to overwrite an existing oilfield object in the target context. As such, Blocks 520-555 may be performed similar to the above method, but the target context in Block 510 may merely be a preexisting oilfield object.

In one or more embodiments, the target oilfield object is generated automatically by an oilfield design application. For example, rather than in response to copy-and-paste commands, a target context may have various oilfield objects designated to be generated automatically by the oilfield design application. Thus, without user intervention, an oilfield design application may auto-populate a file for a design application when the file is first created or at another point in time. As such, in one or more embodiments, the source oilfield object used in Blocks 510-555 may be a default oilfield object associated with an oilfield design application. Thus, in one or more embodiments, the source oilfield object may be selected in Block 505 without being presented in Block 500.

FIGS. 6.1-6.4 provide an example of copying and pasting an oilfield object. The following example is for explanatory purposes only and not intended to limit the scope of the technology. Turning to FIG. 6.1, a source well context (610) includes various background attributes such as source well geological attributes (615) that include geological model attributes (616) with data regarding a model for an old well (617). A source well design object (630) is presented within the source well context (610). As shown in FIG. 6.1, the source well design object (630) includes various oilfield attributes (e.g., source well business information attributes (635), source well drilling objective attributes (640), source well trajectory attributes (645)). A user selects the source well design object (630) and uses the copy function (601). Thus, for copy-and-paste functionality, the source well context (610) is a source context, while the source well design object (630) is a source oilfield object as described in FIGS. 4-5.

Turning to FIG. 6.2, a target well context (650) is shown having various background attributes such as target well geological attributes (665) that include geological model attributes (676) with data regarding a model for a new well (666). As shown, the target well context (650) is empty of oilfield objects. A user may select the target well context (650) and use a paste function (602) to paste the copied source well design object (631) into the target well context (650). Thus, for copy-and-paste functionality, the target well context (650) is a target context as described in FIGS. 4-5.

Turning to FIG. 6.3, oilfield data from source oilfield attributes are shown in comparison to oilfield data generated for a target oilfield object for the target well context (650). For example, the source well business information attributes (635) include a client name attribute (636) with a data string for "Billy Bob" (638), and a well name attribute (637) with a data string for "Billy's Source Well" (639). Additionally, the source well drilling objective attributes (640) include a drilling target attribute (641) with data for coordinates A, B, and C (642) that describe the location coordinates of a drilling target for a wellbore. Furthermore, the source well trajectory attributes (645) include a wellhead location attribute (646) with data for coordinates M, N, and O (648) that describe the wellhead location for a wellbore design. While variables are used to describe coordinate values in FIG. 6.3, it should be noted that numerical values that correspond to global positioning coordinates or other coordinate domains may be used as well. The source well trajectory attributes (645) also include a wellpath attribute (647) with data that describe a source wellpath (649).

Keeping with FIG. 6.3, using data from the source oilfield object, a target oilfield object is generated that includes target well business information attributes (685) (i.e., client name attribute (676), well name attribute (677)), target well drilling objective attributes (690) (i.e., drilling target attribute (671)), and target well trajectory attributes (695) (i.e., wellhead location attribute (686), wellpath attribute (687)). As shown, the target context includes target well geological attributes (665), which include geological model attributes (674). Specifically, the geological model attributes (676) include data regarding a model for a target well (666). With respect to the target well business information attributes (685), data for the client name attribute (676) is replaced directly with data from the source well design object (630) in FIG. 6.1 using a replace function (603). Thus, the client name attribute (676) obtains a string data value for "Billy Bob" (678). However, in the target well context (650), the well name attribute (677), the drilling target attribute (671), and the wellhead location attribute (686) are protected attributes, and data for the protected attributes may not be copied from a source oilfield object. Thus, an object generator may obtain data values from the target well context (650) to populate the well name attribute (677) with a string data value for "Billy's Target Well" (689), the drilling target attribute (671) with data for coordinates D, E, and F (692) that describe a drilling target location for a wellbore, and the wellhead location attribute (686) with data for coordinates G, H, I (698) that describe the wellhead location for a wellbore. In regard to the wellpath attribute (687) for the target well context (650), data for a target wellpath (699) is adjusted from the source wellpath (649) using a geological adjustment (604) and a geometric adjustment (605). In particular, the geological adjustment (604) provides an adjustment of the source wellpath (649) to the target wellpath (699) using the model for the target well (666). Furthermore, the geometric adjustment (605) provides an adjustment of the source wellpath (649) to the target wellpath (699) using data from the drilling target attribute (671) and the wellhead location attribute (686).

Turning to FIG. 6.4, a target wellbore design object (680) is shown generated within the target well context (650). Thus, the target wellbore design object (680) is a result of using the copy function of (601) on the source well design object (630) and using the paste function (602) to transfer the source well design object (630) into the target well context (650).

In one or more embodiments, the oilfield object generation described above provides control within an oilfield design application over transferring oilfield objects from one context to another context. Thus, rather than merely choosing to ignore data and/or copy data from an oilfield object, one or more embodiments described above may provide various sophisticated methods to adjust data to a particular context, such as through a geological adjustment and/or a geometric adjustment. Also, the oilfield object generation may provide a complex integration between data for oilfield attributes that already exist within a given context, and generating target oilfield data for that context.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method, comprising:
obtaining, from a graphical user interface (GUI), a selection of a first oilfield object, wherein the first oilfield object defines a portion of a first wellbore design for a first wellsite;
receiving a request to paste the first oilfield object into a second wellbore design;
determining a target context of the second wellbore design, the target context comprising a geological model having a plurality of oilfield attributes that describes a second wellsite;

obtaining, from the first oilfield object, source oilfield data describing the portion of the first wellbore design;

adjusting the source oilfield data, according to the target context of the second wellbore design and in response to the request, to obtain target oilfield data for the second wellbore design, wherein adjusting the source oilfield data comprises:

performing a geological interpolation on the source oilfield data using the geological model, the geological interpolation accounting for a geological property of the second wellsite described in the target context, wherein the geological property is hidden in the GUI;

generating, using the target oilfield data and in response to the request, a second oilfield object within the target context; and presenting, within the GUI, the second oilfield object.

2. The method of claim 1, further comprising:
determining that an oilfield attribute in the second oilfield object does not depend on the target context,
wherein the second oilfield object is generated with data, from the first oilfield object, for the oilfield attribute.

3. The method of claim 1, further comprising:
matching a first oilfield attribute in the first oilfield object with a second oilfield attribute in the second oilfield object,
wherein the second oilfield object is generated using data for the second oilfield attribute that matches the first oilfield attribute.

4. The method of claim 1, further comprising:
matching a first oilfield attribute in the first oilfield object with a second oilfield attribute in the second oilfield object; and
determining that the second oilfield attribute is protected; and
obtaining, from the target context, the target oilfield data for the second oilfield attribute.

5. The method of claim 1,
wherein the source oilfield data describes a first wellpath in the first wellbore design,
wherein the target oilfield data describe a second wellpath in the second wellbore design, and
wherein adjusting the source oilfield data comprises performing a geometric adjustment on the wellpath in the first wellbore design to produce the target oilfield data.

6. The method of claim 1,
wherein the source oilfield data describes a wellpath in the first wellbore design,
wherein the target oilfield data describe a wellpath in the second wellbore design, and
wherein adjusting the source oilfield data comprises performing, using the geological model for the target context, a geological adjustment on the wellpath to produce the target oilfield data.

7. The method of claim 1,
wherein the target context comprises a geological context surrounding the second wellbore design.

8. A system, comprising:
a data repository for storing:
a first oilfield object comprising source oilfield data that describes a portion of a first wellbore design for a first wellsite;
a computer processor coupled to the data repository;
a graphical user interface (GUI), executable by the computer processor, configured to present the first oilfield object and a second oilfield object; and
an object generator, executable by the computer processor, configured to:
obtain, from the GUI, a selection of the first oilfield object, wherein the first oilfield object defines a portion of a first wellbore design;
receive a request to paste the first oilfield object into a second wellbore design;
determine a target context of the second wellbore design, the target context comprising a geological model having a plurality of oilfield attributes that describes a second wellsite;
obtain, from the first oilfield object, the source oilfield data describing the portion of the first wellbore design;
adjust the source oilfield data, according to the target context of the second wellbore design and in response to the request, to obtain target oilfield data for the second wellbore design, wherein adjusting the source oilfield data comprises:
performing a geological interpolation on the source oilfield data using the geological model, the geological interpolation accounting for a geological property of the second wellsite described in the target context, wherein the geological property is hidden in the GUI; and
generate, using the target oilfield data and in response to the request, the second oilfield object within the target context.

9. The system of claim 8, further comprising:
an attribute identifier, executable by the computer processor, configured to:
determine that an oilfield attribute in the second oilfield object does not depend on the target context,
wherein the second oilfield object is generated with data, from the first oilfield object, for the oilfield attribute.

10. The system of claim 8, further comprising:
an attribute identifier, executable by the computer processor, configured to:
match a first oilfield attribute in the first oilfield object with a second oilfield attribute in the second oilfield object,
wherein the second oilfield object is generated using data for the second oilfield attribute that matches the first oilfield attribute.

11. The system of claim 8, further comprising:
an attribute identifier, executable by the computer processor, configured to:
match a first oilfield attribute in the first oilfield object with a second oilfield attribute in the second oilfield object;
determine that the second oilfield attribute is protected; and
obtain, from the target context, the target oilfield data for the second oilfield attribute.

12. A non-transitory computer readable medium storing instructions, the instructions, when executed by a computer processor, comprising functionality for:
obtaining, from a graphical user interface (GUI), a selection of a first oilfield object, wherein the first oilfield object defines a portion of a first wellbore design for a first wellsite;
receiving a request to paste the first oilfield object into a second wellbore design;

determining a target context of the second wellbore design, the target context comprising a geological model having a plurality of oilfield attributes that describes a second wellsite;

obtaining, from the first oilfield object, source oilfield data describing the portion of the first wellbore design;

adjusting the source oilfield data, according to the target context of the second wellbore design and in response to the request, to obtain target oilfield data for the second wellbore design, wherein adjusting the source oilfield data comprises:

performing a geological interpolation on the source oilfield data using the geological model, the geological interpolation accounting for a geological property of the second wellsite described in the target context, wherein the geological property is hidden in the GUI;

generating, using the target oilfield data and in response to the request, a second oilfield object within the target context; and presenting, within the GUI, the second oilfield object.

13. The non-transitory computer readable medium of claim 12, wherein the instructions further comprise functionality for:

determining that an oilfield attribute in the second oilfield object does not depend on the target context, wherein the second oilfield object is generated with data, from the first oilfield object, for the oilfield attribute.

14. The non-transitory computer readable medium of claim 12, wherein the instructions further comprise functionality for:

matching a first oilfield attribute in the first oilfield object with a second oilfield attribute in the second oilfield object, wherein the second oilfield object is generated using data for the second oilfield attribute that matches the first oilfield attribute.

15. The non-transitory computer readable medium of claim 12, wherein the instructions further comprise functionality for:

matching a first oilfield attribute in the first oilfield object with a second oilfield attribute in the second oilfield object; and determining that the second oilfield attribute is protected; and obtaining, from the target context, the target oilfield data for the second oilfield attribute.

16. The non-transitory computer readable medium of claim 12, wherein the source oilfield data describes a wellpath in the first wellbore design, wherein the target oilfield data describe a wellpath in the second wellbore design, and wherein adjusting the source oilfield data comprises performing a geometric adjustment on the wellpath in the first wellbore design to produce the target oilfield data.

17. The non-transitory computer readable medium of claim 12, wherein the source oilfield data describes a wellpath in the first wellbore design, wherein the target oilfield data describe a wellpath in the second wellbore design, and wherein adjusting the source oilfield data comprises performing, using the geological model for the target context, a geological adjustment on the wellpath to produce the target oilfield data.

18. The non-transitory computer readable medium of claim 12, wherein the target context comprises a geological context surrounding the second wellbore design.

* * * * *